(12) United States Patent
Zhang (10) Patent No.: US 11,151,212 B2
(45) Date of Patent: Oct. 19, 2021

(54) INFORMATION ANALYSIS METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Yangping Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 320 days.

(21) Appl. No.: 16/370,965

(22) Filed: Mar. 30, 2019

(65) Prior Publication Data

US 2019/0228043 A1 Jul. 25, 2019

Related U.S. Application Data

(63) Continuation of application No. PCT/CN2017/118762, filed on Dec. 26, 2017.

(30) Foreign Application Priority Data

Dec. 26, 2016 (CN) .......................... 201611219990.3

(51) Int. Cl.
*G06F 16/9537* (2019.01)
*G06F 16/955* (2019.01)
*G06F 16/9538* (2019.01)

(52) U.S. Cl.
CPC ...... *G06F 16/9537* (2019.01); *G06F 16/9538* (2019.01); *G06F 16/9566* (2019.01)

(58) Field of Classification Search
None
See application file for complete search history.

(56) References Cited

U.S. PATENT DOCUMENTS

2012/0084282 A1* 4/2012 Chiang ................. G06F 16/957
707/725

FOREIGN PATENT DOCUMENTS

| CN | 101373485 A | 2/2009 |
|---|---|---|
| CN | 103455594 A | 12/2013 |

(Continued)

OTHER PUBLICATIONS

The State Intellectual Property Office of the People's Republic of China (SIPO) Office Action 2 for 201611219990.3 dated Jun. 12, 2020 11 Pages (including translation).

(Continued)

*Primary Examiner* — Amresh Singh
(74) *Attorney, Agent, or Firm* — Anova Law Group, PLLC (57) ABSTRACT

The present disclosure provides an information analysis method, an electronic device, and a storage medium. The method includes: determining access frequency information for a candidate online resource in at least two time periods; determining a time factor of the candidate online resource based on the access frequency information for the candidate online resource in each time period; and determining an importance level parameter of each time period. The method also includes: determining a weight value of the candidate online resource based on the time factor; selecting N target online resources based on the weight value of the candidate online resource; and displaying related information of the N target online resources on a target page of a target application, wherein N is an integer.

15 Claims, 4 Drawing Sheets

(56) References Cited

FOREIGN PATENT DOCUMENTS

| CN | 104063504 A | 9/2014 |
| CN | 105183904 A | 12/2015 |
| CN | 106777226 A | 5/2017 |

OTHER PUBLICATIONS

The World Intellectual Property Organization (WIPO) International Search Report for PCT/CN2017/118762 dated Mar. 26, 2018 6 Pages (including translation).
Frits Hoogland, "Throttling IO with Linux", Frits Hoagland Weblog, Dec. 15, 2012, Retrieved from the Internet: URL: https://fritshoogland.wordpress.com/2012/12/15/throttling-io-with-linux/ 6 Pages.
Chandandeep Singh Pabla, "Completely Fair Scheduler", Linux Journal, Aug. 1, 2009, Retrieved from the Internet: URL: https://www.linuxjournal.com/node/10267 9 Pages.

* cited by examiner

INFORMATION ANALYSIS METHOD, ELECTRONIC DEVICE, AND STORAGE MEDIUM

RELATED APPLICATIONS

This application is filed based on and claims priority to PCT Application No. PCT/CN2017/118762, filed on Dec. 26, 2017, which in turn claim priority to Chinese Patent Application No. 201611219990.3, filed on Dec. 26, 2016. The two applications are incorporated herein by reference in their entirety.

FIELD OF TECHNOLOGY

The present disclosure relates to information management technologies in the information processing field, and in particular, to an information analysis method, an electronic device, and a storage medium.

BACKGROUND OF THE DISCLOSURE

A Uniform Resource Locator (URL) is a concise manner of representing a location and an access method of a resource available on the Internet and is a standard resource address. A 2×4 grid means that a browser can have eight windows that may display a user's browsing history records. The history records are displayed according to priorities sorted by using a specific sorting algorithm. The user may directly access corresponding websites by performing operations in the windows.

However, existing implementations may result in problems related to inaccurate display.

SUMMARY

Embodiments of the present disclosure provide an information analysis method, an electronic device, and a storage medium that can at least resolve the foregoing problem that exists in the existing technology.

An embodiment of the present disclosure provides an information analysis method. The method includes: determining access frequency information for a candidate online resource in at least two time periods; determining a time factor of the candidate online resource based on the access frequency information for the candidate online resource in each time period; and determining an importance level parameter of each time period. The method also includes: determining a weight value of the candidate online resource based on the time factor; selecting N target online resources based on the weight value of the candidate online resource; and displaying related information of the N target online resources on a target page of a target application, wherein N is an integer.

An embodiment of the present disclosure provides an electronic device. The device includes: a time dimension processing unit, configured to: determine access frequency information for a candidate online resource in at least two time periods; and determine a time factor of the candidate online resource based on the access frequency information for the candidate online resource in each time period and an importance level parameter of each time period; a weight value calculation unit, configured to determine a weight value of the candidate online resource based on the time factor; and a processing unit, configured to: select N target online resources based on weight values of access requests for the candidate online resources, and display related information of the N target online resources on a target page of a target application, where N is an integer.

An embodiment of the present disclosure provides an information analysis method, applied to an electronic device. The method includes determining, by the electronic device, access frequency information for a candidate online resource in at least two time periods; determining, by the electronic device, a time factor of the candidate online resource based on the access frequency information for the candidate online resource in each time period and an importance level parameter of each time period, and determining a weight value of the candidate online resource based on the time factor; and selecting, by the electronic device, based on the weight value of the candidate online resource, N target online resources, and displaying related information of the N target online resources on a target page of a target application, wherein N is an integer.

For the information analysis method, the electronic device, and the storage medium provided in the embodiments of the present disclosure, the frequency of accessing a candidate online resource is determined based on usage in different time periods, and a weight value of an access request for an online resource is determined based on importance levels of different time periods and access frequency information corresponding to the time periods, so as to determine, according to the weight value, the display on a target page of a target application. Accordingly, the impact of different access time periods on the access of a candidate online resource can be fully considered, thereby resolving the problem of failing to accurately obtain a target online resource that needs to be recommended because different time periods corresponding to an access request cannot be used in combination for recommendation in a processing manner.

DESCRIPTION OF EMBODIMENTS

It should be understood that the specific embodiments described herein are merely used to describe the present disclosure but are not used to limit the present disclosure.

Figure 1:
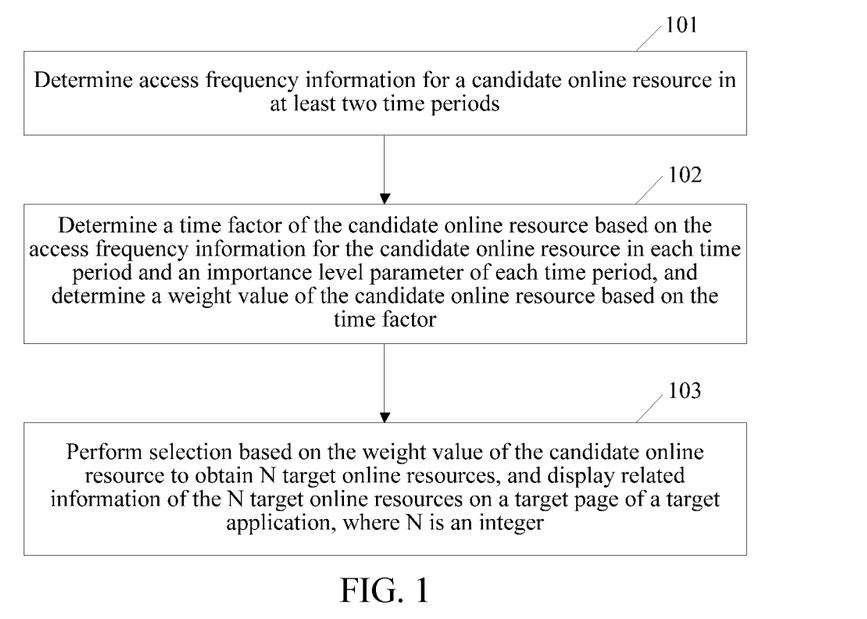
FIG. 1 is a schematic flowchart 1 of an information analysis method according to an embodiment of the present disclosure.

One embodiment of the present disclosure provides an information analysis method. As shown in FIG. 1, the method includes:

Step 101: Determine access frequency information for a candidate online resource in at least two time periods.

Step 102: Determine a time factor of the candidate online resource based on the access frequency information for the candidate online resource in each time period and an importance level parameter of each time period, and determine a weight value of the candidate online resource based on the time factor.

Step 103: Perform selection based on the weight value of the candidate online resource to obtain N target online resources, and display related information of the N target online resources on a target page of a target application, where N is an integer.

The method provided in this embodiment may be applied to any electronic device that can access an online resource, for example, may be applied to a personal computer (PC), a notebook computer, a tablet computer, a smartphone, and the like, which are not enumerated herein.

Before the foregoing step 101, at least one access request for the candidate online resource further needs to be acquired. URL access requests on the side of the electronic device in a period of time may be acquired. The length of the period of time needs to be a length that covers all the time periods of at least one time period in step 101.

Further, the at least two time periods in the foregoing step 101 may be consecutive or may be nonconsecutive. For example, as shown in FIG. 2, there are two subsequent time periods, which are respectively a time period A and a time period B.

Figure 2:
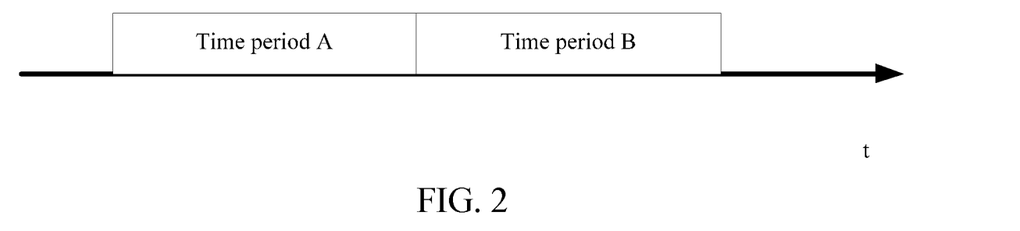
FIG. 2 is a schematic diagram 1 of a time period according to an embodiment of the present disclosure.

In addition, the two time periods shown in FIG. 2 are consecutive time periods. During actual processing, the time period A and the time period B may be nonconsecutive and may be set according to an actual case. For example, a period between 7 o'clock and 12 o'clock at night may usually be a period of time in which the use of a user is relatively frequent, so that the period between 7 o'clock and 12 o'clock may be set as the time period A. The use may be relatively frequent in a period between 10 o'clock and 5 o'clock in the afternoon during the daytime, and this period is set as the time period B. It may be understood that the foregoing setting of several time periods and the foregoing processing manner of acquiring access requests in a segment of duration is merely an example. During actual processing, it is only necessary to determine different time periods and ensure that URL access requests in all time periods can be obtained.

Further, it should be noted that the at least one access request for the candidate online resource may be an access request initiated by using the target application. The target application may be a browser. Assuming that a plurality of browsers are installed on the electronic device, the target application is one of the browsers, and the acquired access request for the candidate online resource may be an access request initiated by using one of the browsers.

In some embodiments, at least one access request for the candidate online resource initiated by a type of applications may be acquired. That is, an access request can be acquired provided that the access request is initiated by a browser.

The determining access frequency information for a candidate online resource in at least two time periods in Step 101 includes: acquiring an access quantity of an access request for the candidate online resource in each time period of at least one time period based on a history record of the access request for the candidate online resource; and calculating the corresponding access frequency information in each time period according to the duration of each time period and the corresponding access quantity.

Figure 3:
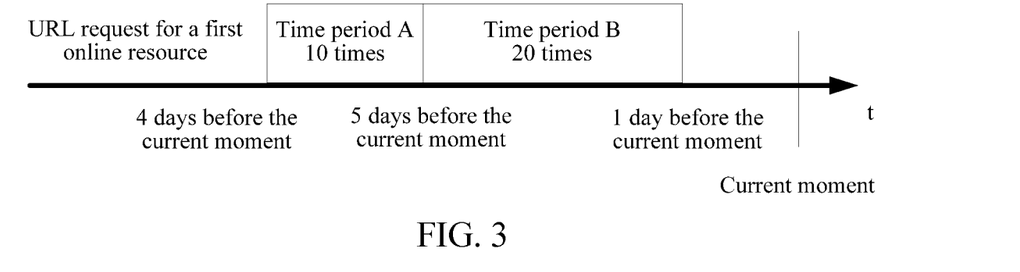
FIG. 3 is a schematic diagram 2 of a time period according to an embodiment of the present disclosure.

For example, referring to FIG. 3, two time periods are respectively a time period A and a time period B, and a URL request for a first online resource is sent 10 times in the time period A and is sent 20 times in the time period B. The lengths of the time periods need to be used to calculate access frequency information for the URL request for the first online resource in the two time periods. Specifically, assuming that the time period A is one day and the time period B is five days, the frequency in the time period A is 10, and the frequency in the time period B is 20/5=4.

Correspondingly, in step 102, a time factor of each access request for the candidate online resource is determined based on access frequency information of each access request for the candidate online resource in each time period and the importance level parameter of each time period, where the importance level parameter of each time period may be set according to an actual case. It may be set that a time period having a larger time difference from a current moment has a smaller importance level parameter, and a history time period having a smaller time difference from a current moment has a larger importance level parameter.

The importance level parameter may have at least one level. For example, assuming that there are an important level and an unimportant level, importance level parameters corresponding to the two levels are respectively 0.1 and 1. There may further be more levels. For example, different importance level parameters set respectively for four levels are 2, 1.5, 1, and 0.5. The levels may be set according to actual processing in specific cases, and are not enumerated in this embodiment.

A manner of calculating a time factor is described with reference to the following formula:

$$\text{timeFactor} = A1*a1/ts1 + \ldots + An*an/tsn,$$

where An is an importance level parameter of a time period; an is an access quantity in the time period, and may be found from a history record, that is, a history table; and tsn is the length of the time period, and for example, may be days or may further be hours, which is not limited herein provided that time can be represented, where n is an integer greater than or equal to 2.

In this embodiment, the determining a weight value of the candidate online resource based on the time factor in step 102 may be: determining a weight value of the access request based on the time factor. Specifically, in the scenario provided in this embodiment, the time factors may be directly used as the weight values, and details are not described again.

Finally, step 103 includes two processing manners:

Processing manner 1: performing sorting based on the weight value of the access request for the candidate online resource, choosing the N target online resources ranking top N based on a sorting result, and displaying the related information of the N target online resources on the target page of the target application, where N is an integer, which may be set according to an actual case or may be set by default in the target application or may be set by a user, and may be, for example, 8.

Figure 4:
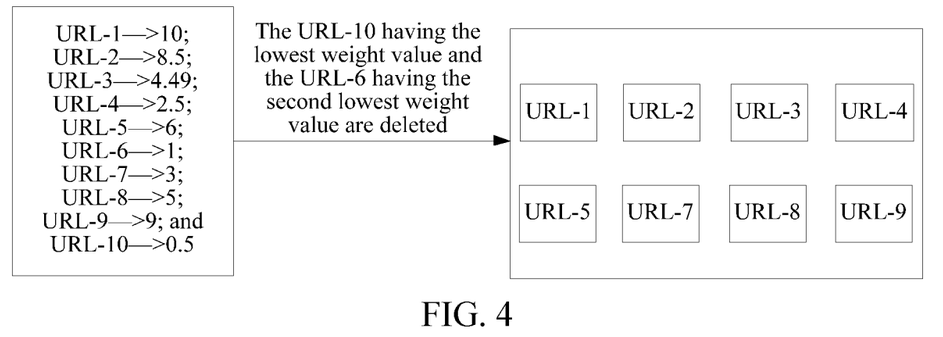
FIG. 4 is a schematic diagram 1 of a presentation scenario according to an embodiment of the present disclosure.

Specifically, for example, referring to FIG. 4, there are currently ten URL access requests, and corresponding weight values are respectively as follows: URL-1→10, URL-2→8.5, URL-3→4.49, URL-4→2.5, URL-5→6, URL-6→1, URL-7→3, URL-8→5, URL-9→9, and URL-10→0.5. Eight URL access requests are chosen from the ten URL access requests. The URL-10 having the lowest weight value and the URL-6 having the second lowest weight value are deleted. A target page displayed on the right side in FIG. 4 is eventually obtained. Information corresponding to eight URL resources is provided on the target page.

Processing manner 2: performing selection based on the weight value of the access request for the candidate online resource to obtain at least one access request whose weight value is greater than a preset threshold for the candidate online resource, obtaining the N target online resources in the at least one access request for the candidate online resource whose weight value is greater than the preset threshold, and displaying the related information of the N target online resources on the target page of the target application.

The preset threshold may be set according to an actual case, and for example, may be set to be greater than 1.

Correspondingly, assuming that the related information corresponding to the N target online resources can be displayed on the target page of the target application, this processing manner further has the following scenarios.

When a quantity of access requests having weight values being greater than the preset threshold for online resources is not greater than N, using all the access requests having weight values being greater than the preset threshold for the online resources as access requests for target online resources, and displaying related information of the target online resources on the target page. Or, when a quantity of access requests having weight values being greater than the preset threshold for online resources is greater than N, choosing any N online resources from the access requests having weight values being greater than the preset threshold for the online resources and using the N online resources as target online resources. Or, when a quantity of access requests having weight values being greater than the preset threshold for online resources is greater than N, among the access requests having weight values being greater than the preset threshold for the online resources, performing sorting performed based on the weight value of the access request for the candidate online resource, choosing the N target online resources ranking top N based on a sorting result, and displaying related information of the N target online resources on the target page of the target application.

Figure 5:
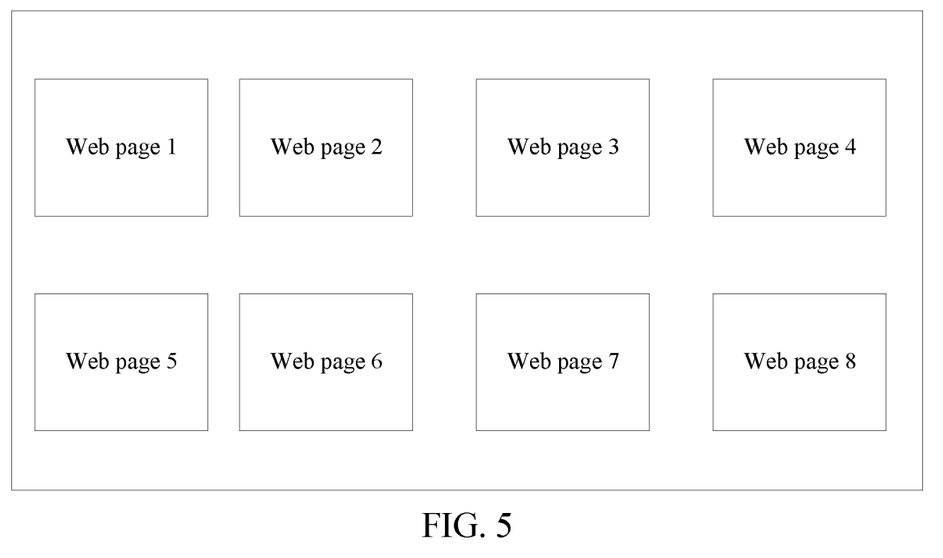
FIG. 5 is a schematic diagram 2 of a presentation scenario according to an embodiment of the present disclosure.

The solution provided in this embodiment may be specifically applied to a 2×4 grid of a browsing record in a browser at a PC end. As shown in FIG. 5, eight history records of web pages that are most frequently visited by a user are recorded, and the web pages are respectively a web page 1 to a web page 8. For example, a user most frequently uses the website 1. In this case, the website 1 appears in the 2×4 grid. When the user starts a browser a next time, the user can conveniently and rapidly open the website 1. By using a 2×4 grid, the user can reach the most frequently visited websites via shortest paths, thereby improving the convenience of browsing by the user.

In embodiments of the present disclosure, the frequency of accessing a candidate online resource may be determined based on usage in different time periods. A weight value of an access request for an online resource may be determined based on importance levels of different time periods and access frequency information corresponding to the time periods, so as to determine, according to the weight value, the display on a target page of a target application. As such, the impact of different access time periods on the access of a candidate online resource can be fully considered. Embodiments of the present disclosure resolve the problem of failing to accurately obtain a target online resource that needs to be recommended because different time periods corresponding to an access request cannot be used in combination for recommendation in a processing manner.

Based on the scenario described above, this embodiment further provides more processing manners about how to calculate weight values, and details are as follows.

Before the determining a weight value of the candidate online resource based on the time factor, the method further includes at least one of the following: acquiring a type of each access request for the candidate online resource, and determining a coefficient factor of the access request for the candidate online resource based on the type; determining whether the candidate online resource in each access request is an intermediate resource, and determining a redirection factor of the access request for the candidate online resource based on a determining result; and determining a length factor of each access request for the candidate online resource according to a length of the access request for the candidate online resource.

How to acquire a coefficient factor, a redirection factor, and a length factor is described below.

Coefficient factor: Specifically, different values are assigned according to types of access request URLs. It may be set that a URL corresponding to a root node corresponds to a largest coefficient factor. A URL corresponding to a static page or an advertisement page is set to have a smallest coefficient factor. In addition, coefficient factors corresponding to more types may further be set. For example, a URL (the URL includes citation &, query ?, or a subpath sign/symbol) of a non-root site is set to have a medium coefficient factor.

For example, a coefficient factor may be set to 1, that is, factor=1, for a root site, for example, a website such as www.baidu.com. Pages with URLs that end with .htm or .html are static pages. Statistically, such pages are mostly advertisement pages or fixed pages. For example, "https://xihuan.jd.com/796376.html" is a commodity details page of a shopping website. Further, pages with URLs that end with swf are mostly advertisement pages. For URLs having these features, the factor is set to 0.1 to reduce the weight of such URLs. For a URL of a non-root site (the URL includes citation &, query ?, or a subpath sign/symbol), the weight of a URL of a non-root site is less than that of a root site but is greater than that of a static page or an advertisement page, and is set to 0.2.

Redirection factor: Redirection is involved to access many websites nowadays. Most websites before redirection are intermediate pages added for safety or statistics. Such intermediate pages are meaningless for access of a user. A URL address after redirection is an address that the user really wants to access. Therefore, the weight is set to 0.9 for such a URL with redirection, and is set to 1.0 for a URL without redirection.

Length factor: The coefficient is 0.1 for a URL having more than 90 characters, and is 1 otherwise. This factor is added to avoid that an excessively long URL history record has an excessively large weight score. Websites that a user often visits are usually root domain URL nodes. This type of URL is relatively short. The user visits some websites occasionally. For example, the user reads a piece of news on a portal website or browses a commodity on a shopping website. Such a highly random access URL usually has a very long URL. The value 90 of the threshold is eventually determined by collecting statistics of a large amount of data. A URL that has more than 90 characters is considered as a URL that is randomly accessed by the user, and has a low weight being 0.1, and a URL that has 90 or fewer characters has a relatively high weight being 1.0.

Further, the determining a weight value of the candidate online resource based on the time factor further includes: performing calculation based on the time factor and at least one of the coefficient factor, the redirection factor, and the length factor to obtain a weight value of each access request for the candidate online resource.

That is, in this embodiment, during the calculation of a weight value, all the foregoing coefficient factor, redirection factor, length factor, and time factor may be multiplied to obtain a weight value. Adjustments may further be made according to actual cases. For example, only the redirection factor and the length factor may be multiplied by the time factor to calculate a weight value, or one of the coefficient factor, the redirection factor, and the length factor may further be multiplied by the time factor to calculate a weight value. During actual calculation, two of the foregoing three factors and the time factor may be used for calculation, or all the three factors and the time factor are used for calculation, or one of the three factors and the time factor are used for calculation. The manners are not enumerated herein again.

A scenario of using all the four factors is described below by using the following formula:

$$score = factor * timeFactor * redirectTypeFactor * urlLengthFactor,$$

where score is an eventually calculated weight value for a URL; factor is a coefficient factor, where different values are assigned according to URL types; timeFactor is a time factor; redirectTypeFactor is a redirection factor; and urlLengthFactor is a length factor.

timeFactor=(A1*a1/ts1+A2*a2/ts2+A3*a3/ts3+A4*a4/ts4), where the meaning represented by each value is:

A—Time period coefficient.

a—Open quantity in a time period, and is found from a history table.

ts—Quantity of days in the time period.

A time period in a time factor may include a plurality of time periods, and for example, may include a total of four time periods [0, 1), [1, 5), [5, 30), and [30, 90) as shown in the foregoing formula, representing a quantity of days of an access record from a current system time. A record of a more recent access has a larger weight during calculation. Specific definitions are as follows:

float A[4]={1.2, 1.0, 0.4, 0.1}; and int ts[4]={1, 4, 25, 60}.

For example, a user accesses the URL www.test.com. By searching history records, it is calculated that access quantities of the user in the four time periods are respectively 2, 4, 5, and 6. In this case, it may be obtained by using the formula that timeFactor=2*1.2/1+4*1.0/2+5*0.4/25+6*0.1/60=4.49. When this method is used for calculation, the impact of access quantities in different time periods on weights is fully considered.

That is, when the foregoing time factor is used for calculation, different impact of access in different time periods on a calculation result can be combined. For a history record of an earlier access, the denominator is larger in the calculation formula of the time factor. Therefore, as time elapses, an older access history has less impact on current sorting. This is a strategy determined according to the use habit of a user. Accordingly, it can be implemented that instead of access records from a long time ago, websites that are frequently visited by the user in a latest period should be preferentially displayed in the 2×4 grid.

Among the four parameter factors, only timeFactor needs to be obtained by searching data, and the other three can all be acquired by using API functions.

For the parameter timeFactor, if a user visits www.test.com, a visit quantity in one last day is obtained according to a SQL statement select count (*) from history where url='www.test.com' and visit_time between (now-1, now), a visit quantity from the second last day to the fifth last day is acquired by using an SQL statement select count (*) from history where url='www.test.com' and visit_time between (now-5, now-1), a visit quantity from the sixth last day to the thirtieth last day is acquired by using an SQL statement select count (*) from history where url='www.test.com' and visit_time between (now-30, now-5), and a visit quantity from the thirty-first last day to the ninetieth last day is acquired by using an SQL statement select count (*) from history where url='www.test.com' and visit_time between (now-90, now-30). The visit quantities are then introduced in the foregoing formula to acquire the value of timeFactor.

The four parameter factors are acquired and then multiplied to eventually obtain a sorting weight. If the score is less than 1.0, it is directly determined that a URL access is not qualified for sorting, and URL access whose score is greater than or equal to 1.0 may join sorting. The reason of selecting 1.0 as a threshold is that if a user randomly visits a non-root domain website for the first time, the foregoing formula is used to calculate that the score=0.2*1.2*1.0*1.0=0.24. Such URLs that the user randomly accesses by large quantities everyday should not be displayed in the 2×4 grid. Therefore, 1.0 is set as the threshold, and only a URL whose score is greater than 1.0 can enter a sorting queue of the 2×4 grid. This also satisfies use habit of the user. Most websites that the user routinely browses belong to random browsing behavior. Such a URL access record does not appear in the 2×4 grid.

Figure 6:
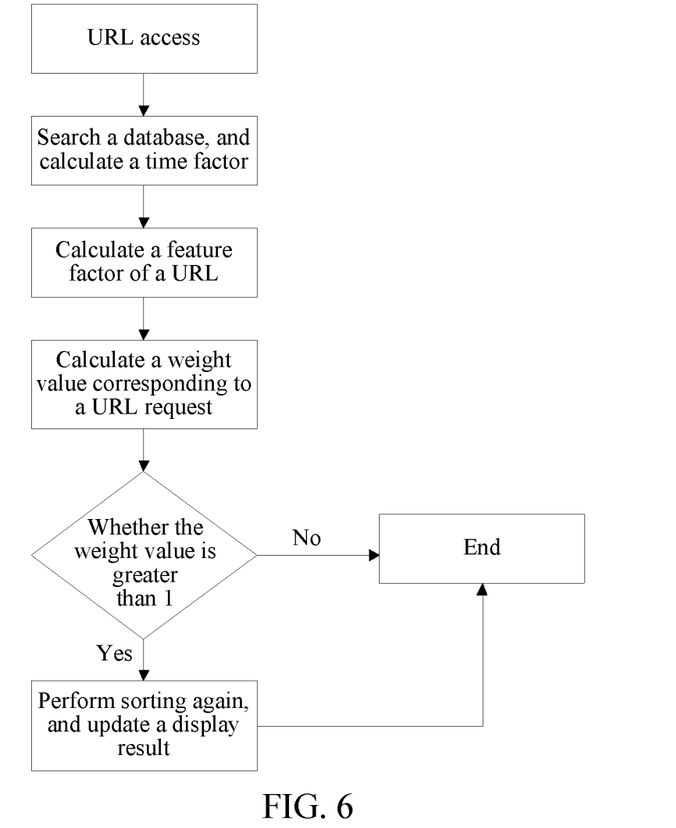
FIG. 6 is a schematic flowchart 2 of an information analysis method according to an embodiment of the present disclosure.

For example, referring to FIG. 6, in this embodiment, URL accesses are first acquired, and a time factor corresponding to each URL access is then calculated based on a database; a plurality of feature factors such as the foregoing coefficient factor are then calculated; a weight value corresponding to the URL request is calculated based on the time factor and the feature factor; it is determined whether the weight value is greater than 1; and in a final step, all URL records whose score is greater than 1.0 are sorted in a descending order, and top eight URL history records are then sequentially displayed in a 2×4 grid.

Figure 7:
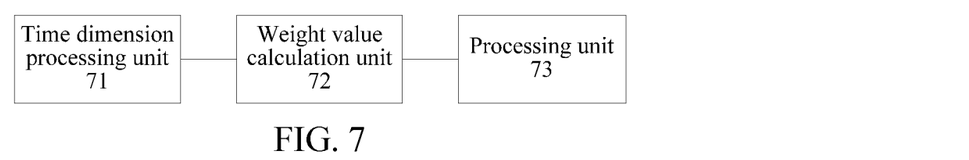
FIG. 7 is a schematic structural composition diagram 1 of an electronic device according to an embodiment of the present disclosure.

This embodiment of the present disclosure provides an electronic device. As shown in FIG. 7, the electronic device includes: a time dimension processing unit 71, configured to: determine access frequency information for a candidate online resource in at least two time periods; and determine a time factor of the candidate online resource based on the access frequency information for the candidate online resource in each time period and an importance level parameter of each time period; a weight value calculation unit 72, configured to determine a weight value of the candidate online resource based on the time factor; and a processing unit 73, configured to: choose N target online resources based on weight values of access requests for the candidate online resources, and display related information of the N target online resources on a target page of a target application, where N is an integer.

The method provided in this embodiment may be applied to any electronic device that can access an online resource, for example, may be applied to a PC, a notebook computer, a tablet computer, a smartphone, and the like, which are not enumerated herein.

The time dimension processing unit 71 is configured to acquire URL access requests on the side of the electronic device in a period of time. The length of the period of time needs to be a length that covers all the time periods of at least one time period.

Further, the at least one time period may be consecutive or may be nonconsecutive. For example, as shown in FIG. 2, the at least one time period is two time periods, which are respectively a time period A and a time period B.

In addition, the two time periods shown in FIG. 2 are consecutive time periods. During actual processing, the time period A and the time period B may be nonconsecutive and may be set according to an actual case. For example, a period between 7 o'clock and 12 o'clock at night may usually be a period of time in which the use of a user is relatively frequent, so that the period between 7 o'clock and 12 o'clock may be set as the time period A. The use may be relatively frequent in a period between 10 o'clock and 5 o'clock in the afternoon during the daytime, and this period is set as the time period B. It may be understood that the foregoing setting of several time periods and the foregoing processing manner of acquiring access requests in a segment of duration is merely an example. During actual processing, it is only necessary to determine different time periods and ensure that URL access requests in all time periods can be obtained.

Further, it should be noted that the at least one access request for the candidate online resource may be an access request initiated by using the target application. The target application may be a browser. Assuming that a plurality of browsers are installed on the electronic device, the target application is one of the browsers, and the acquired access request for the candidate online resource may be an access request initiated by using one of the browsers.

In some embodiments, at least one access request for the candidate online resource initiated by a type of applications may be acquired. That is, an access request can be acquired provided that the access request is initiated by a browser.

The time dimension processing unit 71 is configured to: acquire an access quantity of an access request for the candidate online resource in each time period of at least one time period based on a history record of the access request for the candidate online resource; and calculate the corresponding access frequency information in each time period according to the duration of each time period and the corresponding access quantity.

For example, referring to FIG. 3, two time periods are respectively a time period A and a time period B, and a URL request for a first online resource is sent 10 times in the time period A and is sent 20 times in the time period B. The lengths of the time periods need to be used to calculate access frequency information for the URL request for the first online resource in the two time periods. Specifically, assuming that the time period A is one day and the time period B is five days, the frequency in the time period A is 10, and the frequency in the time period B is 20/5=4.

Correspondingly, the time dimension processing unit 71 is configured to determine a time factor of each access request for the candidate online resource based on access frequency information of each access request for the candidate online resource in each time period and the importance level parameter of each time period, where the importance level parameter of each time period may be set according to an actual case. It may be set that a time period having a larger time difference from a current moment has a smaller importance level parameter, and a history time period having a smaller time difference from a current moment has a larger importance level parameter.

The importance level parameter may have at least one level. For example, assuming that there are an important level and an unimportant level, importance level parameters corresponding to the two levels are respectively 0.1 and 1. There may further be more levels. For example, different importance level parameters set respectively for four levels are 2, 1.5, 1, and 0.5. The levels may be set according to actual processing in specific cases, and are not enumerated in this embodiment.

A manner of calculating a time factor is described with reference to the following formula:

$$\text{timeFactor} = A1*a1/ts1 + \ldots + An*an/tsn,$$

where An is an importance level parameter of a time period; an is an access quantity in the time period, and may be found from a history record, that is, a history table; and tsn is the length of the time period, and for example, may be days, where n is an integer greater than or equal to 2.

In this embodiment, the weight value calculation unit 72 is configured to determine a weight value of the access request based on the time factor. Specifically, in the scenario provided in this embodiment, the time factors may be directly used as the weight values, and details are not described again.

The processing unit is configured to: choose N target online resources based on weight values of access requests for the candidate online resources, and display related information of the N target online resources on a target page of a target application. Specifically:

Processing manner 1:

The processing unit is configured to: perform sorting based on the weight value of the access request for the candidate online resource, choose the N target online resources ranking top N based on a sorting result, and display related information of the N target online resources on the target page of the target application, where N is an integer, which may be set according to an actual case or may be set by default in the target application or may be set by a user, and may be, for example, 8.

Specifically, for example, referring to FIG. 4, there are currently ten URL access requests, and corresponding weight values are respectively as follows: URL-1→10, URL-2→8.5, URL-3→4.49, URL-4→2.5, URL-5→6, URL-6→1, URL-7→3, URL-8→5, URL-9→9, and URL-10→0.5. Eight URL access requests are chosen from the ten URL access requests. The URL-10 having the lowest weight value and the URL-6 having the second lowest weight value are deleted. A target page displayed on the right side in FIG. 4 is eventually obtained. Information corresponding to eight URL resources is provided on the target page.

Processing manner 2:

The processing unit is configured to: perform selection based on the weight value of the access request for the candidate online resource to obtain at least one access request whose weight value is greater than a preset threshold for the candidate online resource, obtain the N target online resources in the at least one access request for the candidate online resource whose weight value is greater than the preset threshold, and display related information of the N target online resources on the target page of the target application.

The preset threshold may be set according to an actual case, and for example, may be set to be greater than 1.

Correspondingly, assuming that the related information corresponding to the N target online resources can be displayed on the target page of the target application, this processing manner further has the following scenarios.

When a quantity of access requests having weight values being greater than the preset threshold for online resources is not greater than N, using all the access requests having weight values being greater than the preset threshold for the online resources as access requests for target online resources, and displaying related information of the target online resources on the target page. Or, when a quantity of access requests having weight values being greater than the preset threshold for online resources is greater than N, choosing any N online resources from the access requests having weight values being greater than the preset threshold for the online resources and using the N online resources as target online resources. Or, when a quantity of access requests having weight values being greater than the preset threshold for online resources is greater than N, among the access requests having weight values being greater than the preset threshold for the online resources, performing sorting performed based on the weight value of the access request for the candidate online resource, choosing the N target online resources ranking top N based on a sorting result, and displaying related information of the N target online resources on the target page of the target application.

The solution provided in this embodiment may be specifically applied to a 2×4 grid in a browser at a PC end. As shown in FIG. 5, eight history records of web pages that are most frequently visited by a user are recorded, and the web pages are respectively a web page 1 to a web page 8. For example, a user most frequently uses the website 1. In this case, the website 1 appears in the 2×4 grid. When the user starts a browser a next time, the user can conveniently and rapidly open the website 1. By using a 2×4 grid, the user can reach the most frequently visited websites via shortest paths, thereby improving the convenience of browsing by the user.

In embodiments of the present disclosure, the frequency of accessing a candidate online resource may be determined based on usage in different time periods. A weight value of an access request for an online resource may be determined based on importance levels of different time periods and access frequency information corresponding to the time periods, so as to determine, according to the weight value, the display on a target page of a target application. As such, the impact of different access time periods on the access of a candidate online resource can be fully considered. Embodiments of the present disclosure resolve the problem of failing to accurately obtain a target online resource that needs to be recommended because different time periods corresponding to an access request cannot be used in combination for recommendation in a processing manner.

Figure 8:
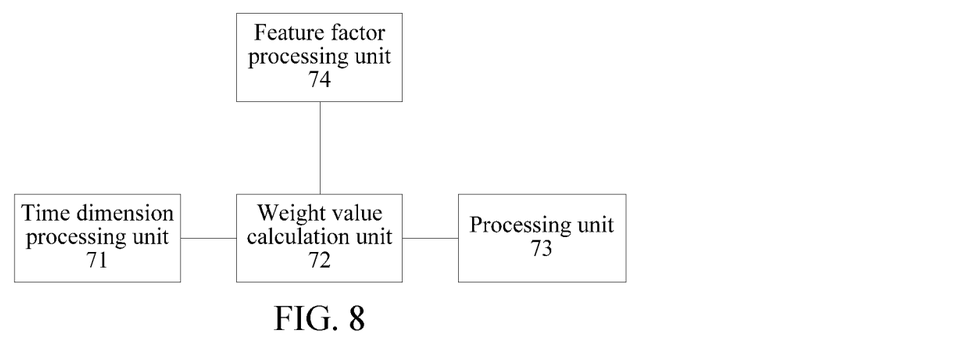
FIG. 8 is a schematic structural composition diagram 2 of an electronic device according to an embodiment of the present disclosure.

Based on the scenario in FIG. 7 in the previous embodiment, with reference to FIG. 8, this embodiment further provides more processing manners about how to calculate a weight value, and details are as follows.

The electronic device further includes a feature factor processing unit 74, configured to perform at least one of the following processes: acquiring a type of each access request for the candidate online resource, and determining a coefficient factor of the access request for the candidate online resource based on the type; determining whether the candidate online resource in each access request is an intermediate resource, and determining a redirection factor of the access request for the candidate online resource based on a determining result; and determining a length factor of each access request for the candidate online resource according to a length of the access request for the candidate online resource.

How to determine a coefficient factor, a redirection factor, and a length factor is described below first.

Coefficient factor: Specifically, different values are assigned according to types of access request URLs. It may be set that a URL corresponding to a root node corresponds to a largest coefficient factor. A URL corresponding to a static page or an advertisement page is set to have a smallest coefficient factor. In addition, coefficient factors corresponding to more types may further be set. For example, a URL (the URL includes citation &, query ?, or a subpath sign/symbol) of a non-root site is set to have a medium coefficient factor.

For example, a coefficient factor may be set to 1, that is, factor=1, for a root site, for example, a website such as www.baidu.com. Pages with URLs that end with .htm or .html are static pages. Statistically, such pages are mostly advertisement pages or fixed pages. For example, "https://xihuan.jd.com/796376.html" is a commodity details page of a shopping website. Further, pages with URLs that end with swf are mostly advertisement pages. For URLs having these features, the factor is set to 0.1 to reduce the weight of such URLs. For a URL of a non-root site (the URL includes citation &, query ?, or a subpath sign/symbol), the weight of a URL of a non-root site is less than that of a root site but is greater than that of a static page or an advertisement page, and is set to 0.2.

Redirection factor: Redirection is involved to access many websites nowadays. Most websites before redirection are intermediate pages added for safety or statistics. Such intermediate pages are meaningless for access of a user. A URL address after redirection is an address that the user really wants to access. Therefore, the weight is set to 0.9 for such a URL with redirection, and is set to 1.0 for a URL without redirection.

Length factor: The coefficient is 0.1 for a URL having more than 90 characters, and is 1 otherwise. This factor is added to avoid that an excessively long URL history record has an excessively large weight score. Websites that a user often visits are usually root domain URL nodes. This type of URL is relatively short. The user visits some websites occasionally. For example, the user reads a piece of news on a portal website or browses a commodity on a shopping website. Such a highly random access URL usually has a very long URL. The value 90 of the threshold is eventually determined by collecting statistics of a large amount of data. A URL that has more than 90 characters is considered as a URL that is randomly accessed by the user, and has a low weight being 0.1, and a URL that has 90 or fewer characters has a relatively high weight being 1.0.

Further, the weight value calculation unit is configured to perform calculation based on the time factor and at least one of the coefficient factor, the redirection factor, and the length factor to obtain a weight value of each access request for the candidate online resource.

That is, in this embodiment, during the calculation of a weight value, all the foregoing coefficient factor, redirection factor, length factor, and time factor may be multiplied to obtain a weight value. Adjustments may further be made according to actual cases. For example, only the redirection factor and the length factor may be multiplied by the time factor to calculate a weight value, or one of the coefficient factor, the redirection factor, and the length factor may further be multiplied by the time factor to calculate a weight value. During specific implementation, all the foregoing three factors or each of the three factors and the time factor are used for calculation. The cases are not enumerated herein again.

The foregoing embodiment is described below by using a scenario of calculating a weight value by using all factors in the following formula:

$$score = factor * timeFactor * redirectTypeFactor * urlLengthFactor,$$

where score is an eventually calculated weight value for a URL.

factor is a coefficient factor, where different values are assigned according to URL types; timeFactor is a time factor; redirectTypeFactor is a redirection factor; and urlLengthFactor is a length factor.

$timeFactor = (A1*a1/ts1 + A2*a2/ts2 + A3*a3/ts3 + A4*a4/ts4)$, where the meaning represented by each value is:

A—Time period coefficient.

a—Open quantity in a time period, and is found from a history table.

ts—Quantity of days in the time period.

A time period in a time factor may include a plurality of time periods, and for example, may include a total of four time periods [0, 1), [1, 5), [5, 30), and [30, 90) as shown in the foregoing formula, representing a quantity of days of an access record from a current system time.

A record of a more recent access has a larger weight during calculation. Specific definitions are as follows:

float $A[4] = \{1.2, 1.0, 0.4, 0.1\}$; and
int $ts[4] = \{1, 4, 25, 60\}$.

For example, a user accesses the URL www.test.com. By searching history records, it is calculated that access quantities of the user in the four time periods are respectively 2, 4, 5, and 6. In this case, it may be obtained by using the formula that timeFactor = $2*1.2/1 + 4*1.0/2 + 5*0.4/25 + 6*0.1/60 = 4.49$. When this method is used for calculation, the impact of access quantities in different time periods on weights is fully considered.

That is, when the foregoing time factor is used for calculation, different impact of access in different time periods on a calculation result can be combined. For a history record of an earlier access, the denominator is larger in the calculation formula of the time factor. Therefore, as time elapses, an older access history has less impact on current sorting. This is a strategy determined according to the use habit of a user. Accordingly, it can be implemented that instead of access records from a long time ago, websites that are frequently visited by the user in a latest period should be preferentially displayed in the 2×4 grid.

Among the four parameter factors, only timeFactor needs to be obtained by searching data, and the other three can all be acquired by using API functions.

For the parameter timeFactor, if a user visits www.test.com, a visit quantity in one last day is obtained according to a SQL statement select count (*) from history where url='www.test.com' and visit_time between (now-1, now), a visit quantity from the second last day to the fifth last day is acquired by using an SQL statement select count (*) from history where url='www.test.com' and visit_time between (now-5, now-1), a visit quantity from the sixth last day to the thirtieth last day is acquired by using an SQL statement select count (*) from history where url='www.test.com' and visit_time between (now-30, now-5), and a visit quantity from the thirty-first last day to the ninetieth last day is acquired by using an SQL statement select count (*) from history where url='www.test.com' and visit_time between (now-90, now-30). The visit quantities are then introduced in the foregoing formula to acquire the value of timeFactor.

The four parameter factors are acquired and then multiplied to eventually obtain a sorting weight. If the score is less than 1.0, it is directly determined that a URL access is not qualified for sorting, and URL access whose score is greater than or equal to 1.0 may join sorting. The reason of selecting 1.0 as a threshold is that if a user randomly visits a non-root domain website for the first time, the foregoing formula is used to calculate that the score = $0.2*1.2*1.0*1.0 = 0.24$. Such URLs that the user randomly accesses by large quantities everyday should not be displayed in the 2×4 grid. Therefore, 1.0 is set as the threshold, and only a URL whose score is greater than 1.0 can enter a sorting queue of the 2×4 grid. This also satisfies use habit of the user. Most websites that the user routinely browses belong to random browsing behavior. Such a URL access record does not appear in the 2×4 grid shown in FIG. 5.

For example, referring to FIG. 6, in this embodiment, URL accesses are first acquired, and a time factor corresponding to each URL access is then calculated based on a database; a plurality of feature factors such as the foregoing coefficient factor are then calculated; a weight value corresponding to the URL request is calculated based on the time factor and the feature factor; it is determined whether the weight value is greater than 1; and in a final step, all URL records whose score is greater than 1.0 are sorted in a descending order, and top eight URL history records are then sequentially displayed in a 2×4 grid.

Figure 9:
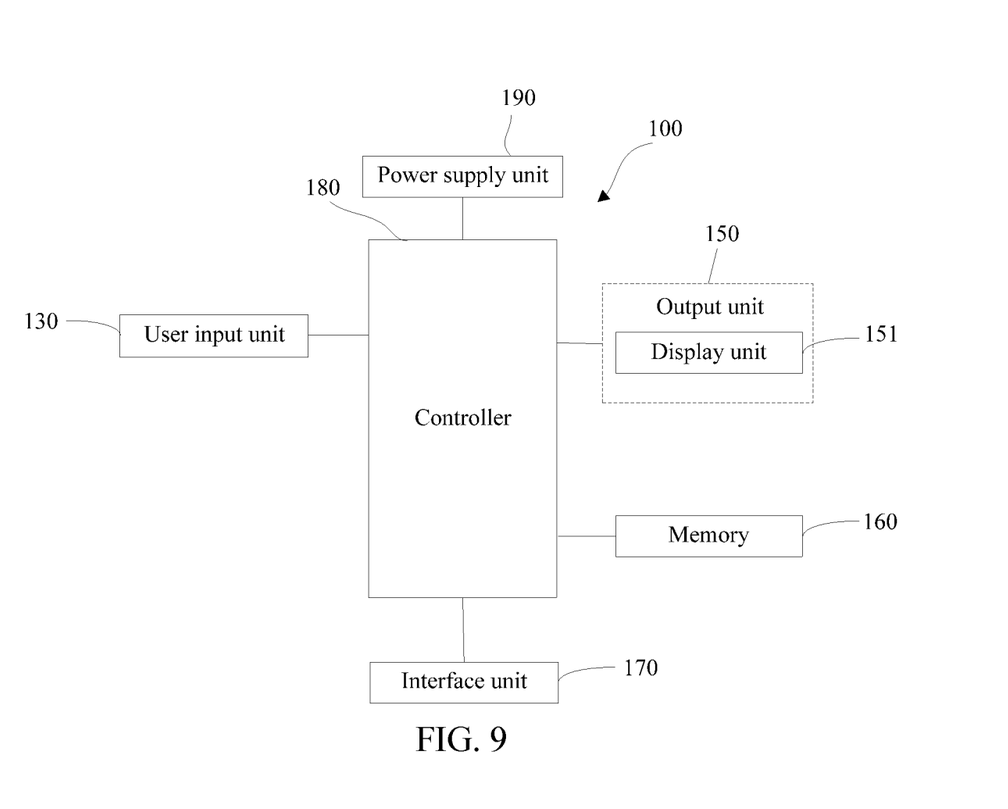
FIG. 9 is a schematic structural diagram of hardware of an electronic device according to an embodiment of the present disclosure.

The electronic device provided in this embodiment of the present disclosure may be implemented in various forms, and may include, for example, an electronic device such as a mobile phone, a smartphone, a notebook computer, a digital broadcasting receiver, a personal digital assistant (PDA), a tablet computer (PAD), a portable multimedia player (PMP), and a navigation apparatus and a fixed terminal such as a digital TV and a desktop computer. FIG. 9 is a schematic structural diagram of hardware of an electronic device for implementing various embodiments of the present disclosure.

The electronic device 100 may include a user input unit 130, an output unit 150, a memory 160, an interface unit 170, a controller 180, a power supply unit 190, and the like. Elements of the electronic device are described below in detail.

The user input unit 130 may generate key input data according to a command input by a user to control various operations of the electronic device. The user input unit 130 allows a user to input various types of information, and may include a keyboard, a metal dome, a touchpad (for example, a touch-sensitive component that detects a change of resistance, pressure, capacitance, and the like caused by a contact), a scroll wheel, a joystick, and the like. Particularly, when the touchpad is stacked on a display unit 151 in a layer form, a touch screen can be formed.

The interface unit 170 is used as an interface through which at least one external apparatus and the electronic device 100 are connected. For example, the external apparatus may include a wired or wireless headset port, an external power supply (or battery charger) port, a wired or wireless data port, a memory card port, a port for connecting an apparatus having an identity module, an audio input/output (I/O) port, a video I/O port, an earphone port, and the like. The identity module may store various information used to authenticate a user that uses the electronic device 100 and may include a user identity module (UIM), a subscriber identity module (SIM), a universal subscriber identity module (USIM), and the like. In addition, the apparatus (referred to as an "identity apparatus" below) having an identity module may use a smart card form. Therefore, the identity apparatus may be connected to the electronic device 100 through a port or another connection apparatus. The interface unit 170 may be configured to receive an input (for example, data information, electricity, and the like) from the external apparatus and transmit the received input to one or more elements in the electronic device 100 or may be configured to transmit data between the electronic device and the external apparatus.

In addition, when the electronic device 100 is connected to an external base, the interface unit 170 may be used as a path that allows electricity to be supplied from the base to the electronic device 100 or may be used as a path that allows various command signals input at the base to be transmitted from the base to the electronic device. Electricity or one of the various command signals input at the base may be used as a signal used to recognize whether the electronic device is accurately installed on the base. The output unit 150 is constructed to provide an output signal (for example, an audio signal, a video signal, an alarm signal, and a vibration signal) in a visual, audio and/or tactic manner.

The output unit 150 may include the display unit 151 and the like. The display unit 151 may display information processed in the electronic device 100. For example, when the electronic device 100 is in a phone call mode, the display unit 151 may display a user interface (UI) or a graphical user interface (GUI) to a call or other communication (for example, text message receiving and sending, multimedia file downloading, and the like). When the electronic device 100 is in a video call mode or an image capture mode, the display unit 151 may display a captured image and/or received image and show a UI, GUI or the like of a video or image and related functions.

Meanwhile, when the display unit 151 and the touchpad are stacked with each other in a layer form to form a touch screen, the display unit 151 may be used as an input apparatus and an output apparatus. The display unit 151 may include at least one of a liquid crystal display (LCD), a thin-film transistor LCD (TFT-LCD), an organic light-emitting diode (OLED) display, a flexible display, a three-dimensional (3D) display, and the like. Some of these displays may be constructed to be transparent to allow a user to watch from outside. This may be referred to as a transparent display. A typical transparent display may be, for example, a transparent organic light-emitting diode (TOLED) display, and the like. According to a specific desired implementation, the electronic device 100 may include two or more display units (or another display apparatus). For example, the electronic device may include an external display unit (not shown) and an internal display unit (not shown). The touch screen may be configured to detect a touch input pressure and a touch input position and a touch input area.

The memory 160 may store software programs or the like of processing and control operations performed by the controller 180, or may temporarily store data (for example, an address book, a message, a static image, a video, and the like) that has been output or is about to be output. Moreover, the memory 160 may store data about vibration and audio signals in various manners output when a touch is applied to the touch screen.

The memory 160 may include at least one type of storage medium. The storage medium includes a flash memory, a hard disk, a multimedia card, a card memory (for example, an SD or DX memory), a random-access memory (RAM), a static random-access memory (SRAM), a read-only memory (ROM), an electrically-erasable programmable read-only memory (EEPROM), a programmable read-only memory (PROM), a magnetic memory, a magnetic disk, an optical disc, and the like. Moreover, the electronic device 100 may collaborate with a network storage apparatus that is connected through a network and performs the storage function of the memory 160.

The controller 180 usually controls overall operations of the electronic device. For example, the controller 180 performs control and processing related to voice calls, data communication, video calls, and the like.

The power supply unit 190 is controlled by the controller 180 to receive external electricity or internal electricity and provide appropriate electricity required for operating various elements and components.

The various implementations described herein may be implemented by using a computer readable medium such as computer software, hardware or any combination thereof. For hardware implementations, the implementations described herein may be implemented by using at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to execute the functions described herein. In some cases, such implementations may be implemented in the controller 180.

For software implementations, implementations such as processes or functions may be implemented by using a separate software module or software unit that allows the execution of at least one function or operation as described. Software code may be implemented by using a software application program (or program) that is compiled by using any appropriate programming language. The software code may be stored in the memory 160 and executed by the controller 180.

The technical solution provided in this application is described again by using the foregoing electronic device as an execution object: determining, by the electronic device, access frequency information for a candidate online resource in at least two time periods; determining, by the electronic device, a time factor of the candidate online resource based on the access frequency information for the candidate online resource in each time period and an importance level parameter of each time period, and determining a weight value of the candidate online resource based on the time factor; and performing, by the electronic device, selection based on the weight value of the candidate online resource to obtain N target online resources, and displaying related information of the N target online resources on a target page of a target application, where N is an integer.

The method provided in this embodiment may be applied to any electronic device that can access an online resource, for example, may be applied to a PC, a notebook computer, a tablet computer, a smartphone, and the like, which are not enumerated herein.

The electronic device further needs to acquire at least one access request for the candidate online resource, and may acquire URL access requests on the side of the electronic device in a period of time. The length of the period of time needs to be a length that covers all the time periods of at least one time period.

Further, the at least two time periods may be consecutive or may be nonconsecutive. For example, as shown in FIG. 2, there are two subsequent time periods, which are respectively a time period A and a time period B.

In addition, the two time periods shown in FIG. 2 are consecutive time periods. During actual processing, the time period A and the time period B may be nonconsecutive and may be set according to an actual case. For example, a period between 7 o'clock and 12 o'clock at night may usually be a period of time in which the use of a user is relatively frequent, so that the period between 7 o'clock and 12 o'clock may be set as the time period A. The use may be relatively frequent in a period between 10 o'clock and 5 o'clock in the afternoon during the daytime, and this period is set as the time period B. It may be understood that the foregoing setting of several time periods and the foregoing processing manner of acquiring access requests in a segment of duration is merely an example. During actual processing, it is only necessary to determine different time periods and ensure that URL access requests in all time periods can be obtained.

Further, it should be noted that the at least one access request for the candidate online resource may be an access request initiated by using the target application. The target application may be a browser. Assuming that a plurality of browsers are installed on the electronic device, the target application is one of the browsers, and the acquired access request for the candidate online resource may be an access request initiated by using one of the browsers.

In some embodiments, at least one access request for the candidate online resource initiated by a type of applications may be acquired. That is, an access request can be acquired provided that the access request is initiated by a browser.

The electronic device acquires an access quantity of an access request for the candidate online resource in each time period of at least one time period based on a history record of the access request for the candidate online resource; and calculates the corresponding access frequency information in each time period according to the duration of each time period and the corresponding access quantity.

For example, referring to FIG. 3, two time periods are respectively a time period A and a time period B, and a URL request for a first online resource is sent 10 times in the time period A and is sent 20 times in the time period B. The lengths of the time periods need to be used to calculate access frequency information for the URL request for the first online resource in the two time periods. Specifically, assuming that the time period A is one day and the time period B is five days, the frequency in the time period A is 10, and the frequency in the time period B is 20/5=4.

Correspondingly, a time factor of each access request for the candidate online resource is determined based on access frequency information of each access request for the candidate online resource in each time period and the importance level parameter of each time period, where the importance level parameter of each time period may be set according to an actual case. It may be set that a time period having a larger time difference from a current moment has a smaller importance level parameter, and a history time period having a smaller time difference from a current moment has a larger importance level parameter.

The importance level parameter may have at least one level. For example, assuming that there are an important level and an unimportant level, importance level parameters corresponding to the two levels are respectively 0.1 and 1. There may further be more levels. For example, different importance level parameters set respectively for four levels are 2, 1.5, 1, and 0.5. The levels may be set according to actual processing in specific cases, and are not enumerated in this embodiment.

A manner of calculating a time factor is described with reference to the following formula:

$$\text{timeFactor} = A1 * a1/ts1 + \ldots + An * an/tsn,$$

where $An$ is an importance level parameter of a time period; $an$ is an access quantity in the time period, and may be found from a history record, that is, a history table; and $tsn$ is the length of the time period, and for example, may be days or may further be hours, which is not limited herein provided that time can be represented, where $n$ is an integer greater than or equal to 2.

In this embodiment, the determining, by the electronic device, a weight value of the candidate online resource based on the time factor may be: determining a weight value of the access request based on the time factor. Specifically, in the scenario provided in this embodiment, the time factors may be directly used as the weight values, and details are not described again.

Finally, the performing, by the electronic device, selection based on the weight value of the candidate online resource to obtain N target online resources, and displaying related information of the N target online resources on a target page of a target application includes two processing manners:

Processing manner 1: performing, by the electronic device, sorting based on the weight value of the access request for the candidate online resource, choosing the N target online resources ranking top N based on a sorting result, and displaying the related information of the N target online resources on the target page of the target application, where N is an integer, which may be set according to an actual case or may be set by default in the target application or may be set by a user, and may be, for example, 8.

Specifically, for example, referring to FIG. 4, there are currently ten URL access requests, and corresponding weight values are respectively as follows: URL-1→10, URL-2→8.5, URL-3→4.49, URL-4→2.5, URL-5→6, URL-6→1, URL-7→3, URL-8→5, URL-9→9, and URL-10→0.5. Eight URL access requests are chosen from the ten URL access requests. The URL-10 having the lowest weight value and the URL-6 having the second lowest weight value are deleted. A target page displayed on the right side in FIG. 4 is eventually obtained. Information corresponding to eight URL resources is provided on the target page.

Processing manner 2: choosing, by the electronic device based on the weight value of the access request for the candidate online resource, at least one access request whose weight value is greater than a preset threshold for the candidate online resource, obtaining the N target online resources in the at least one access request for the candidate online resource whose weight value is greater than the preset threshold, and displaying the related information of the N target online resources on the target page of the target application.

The preset threshold may be set according to an actual case, and for example, may be set to be greater than 1.

Correspondingly, assuming that the related information corresponding to the N target online resources can be displayed on the target page of the target application, this processing manner further has the following scenarios.

When a quantity of access requests having weight values being greater than the preset threshold for online resources is not greater than N, using all the access requests having weight values being greater than the preset threshold for the online resources as access requests for target online resources, and displaying related information of the target online resources on the target page. Or, when a quantity of access requests having weight values being greater than the preset threshold for online resources is greater than N, choosing any N online resources from the access requests having weight values being greater than the preset threshold for the online resources and using the N online resources as target online resources. Or, when a quantity of access requests having weight values being greater than the preset threshold for online resources is greater than N, among the access requests having weight values being greater than the preset threshold for the online resources, performing sorting performed based on the weight value of the access request for the candidate online resource, choosing the N target online resources ranking top N based on a sorting result, and displaying related information of the N target online resources on the target page of the target application.

The solution provided in this embodiment may be specifically applied to a 2×4 grid of a browsing record in a browser at a PC end. As shown in FIG. 5, eight history records of web pages that are most frequently visited by a user are recorded, and the web pages are respectively a web page 1 to a web page 8. For example, a user most frequently uses the website 1. In this case, the website 1 appears in the 2×4 grid. When the user starts a browser a next time, the user can conveniently and rapidly open the website 1. By using a 2×4 grid, the user can reach the most frequently visited websites via shortest paths, thereby improving the convenience of browsing by the user.

In embodiments of the present disclosure, the frequency of accessing a candidate online resource may be determined based on usage in different time periods. A weight value of an access request for an online resource may be determined based on importance levels of different time periods and access frequency information corresponding to the time periods, so as to determine, according to the weight value, the display on a target page of a target application. As such, the impact of different access time periods on the access of a candidate online resource can be fully considered. Embodiments of the present disclosure resolve the problem of failing to accurately obtain a target online resource that needs to be recommended because different time periods corresponding to an access request cannot be used in combination for recommendation in a processing manner.

An embodiment of this application further provides an electronic device, including a memory, configured to store an executable program; and a processor, configured to implement, by executing the executable program stored in the memory, the following operations: determining access frequency information for a candidate online resource in at least two time periods; determining a time factor of the candidate online resource based on the access frequency information for the candidate online resource in each time period and an importance level parameter of each time period, and determining a weight value of the candidate online resource based on the time factor; and performing selection based on the weight value of the candidate online resource to obtain N target online resources, and displaying related information of the N target online resources on a target page of a target application, where N is an integer.

An embodiment of this application further provides a storage medium. The storage medium includes a group of instructions, where when the instructions are executed, at least one processor is caused to perform the following operations: determining access frequency information for a candidate online resource in at least two time periods; determining a time factor of the candidate online resource based on the access frequency information for the candidate online resource in each time period and an importance level parameter of each time period, and determining a weight value of the candidate online resource based on the time factor; and performing selection based on the weight value of the candidate online resource to obtain N target online resources, and displaying related information of the N target online resources on a target page of a target application, where N is an integer.

The above descriptions are merely specific embodiments of the present disclosure, but are not intended to limit the scope of the present disclosure. Any variations or replacement that can be easily derived by those skilled in the art should fall within the scope of the present disclosure. Therefore, the protection scope of the present disclosure is subject to the appended claims.

What is claimed is:

1. An information analysis method, implemented by an electronic device, comprising:
    determining, for a plurality of access requests of candidate online resources, access frequency information for each candidate online resource in at least two time periods;
    determining a time factor of the candidate online resource based on the access frequency information for the candidate online resource in each time period;
    determining an importance level parameter of each time period;
    acquiring a type of each access request for the candidate online resource, and determining a coefficient factor of the access request for the candidate online resource based on the type;
    determining whether the candidate online resource in each access request is an intermediate resource that leads to a redirected resource, and determining a redirection factor of the access request for the candidate online resource based on a determination on whether the candidate online resource is an intermediate resource;
    determining a length factor of each access request for the candidate online resource according to a number of characters included in the access request for the candidate online resource, the length factor being a first value if the number of characters is less than a preset number threshold or a second value if the number of characters is not less than the preset number threshold;
    determining a weight value of the candidate online resource based on the time factor, the coefficient factor, the redirection factor, and the length factor;
    selecting, among a plurality of candidate online resources, N target online resources based on the respective weight values of the candidate online resources; and
    displaying related information of the N target online resources on a target starting page of a browsing application as shortcuts of accessing the N target online resources, wherein N is an integer greater than 2.

2. The method according to claim 1, wherein the determining access frequency information for a candidate online resource in at least two time periods comprises:
    acquiring an access quantity of an access request for the candidate online resource in at least one time period based on a history record of the access request for the candidate online resource; and
    calculating the corresponding access frequency information in each time period according to the duration of each time period and the corresponding access quantity.

3. The method according to claim 2, further comprising:
    sorting based on the weight value of the access request for the candidate online resource; selecting the N target online resources ranking top N based on a sorting result; and displaying the related information of the N target online resources on the target starting page of the browsing application.

4. The method according to claim 1, further comprising: sorting based on the weight value of the access request for the candidate online resource; selecting the N target online resources ranking top N based on a sorting result; and displaying the related information of the N target online resources on the target starting page of the browsing application.

5. The method according to claim 1, further comprising: selecting at least one access request with weight value greater than a threshold for the candidate online resource based on the weight value of the access request for the candidate online resource; obtaining the N target online resources in the at least one access request for the candidate online resource whose weight value is greater than the threshold, and displaying the related information of the N target online resources on the target starting page of the browsing application.

6. The method according to claim 1, wherein the weight value of each access request for the candidate online resource is positively related to the time factor, the coefficient factor, the redirection factor, and the length factor.

7. An electronic device, comprising:
a memory, configured to store an executable program; and
a processor, configured to run the executable program stored in the memory to:
determine, for a plurality of access requests of candidate online resources, access frequency information for a candidate online resource in at least two time periods;
determine a time factor of the candidate online resource based on the access frequency information for the candidate online resource in each time period and an importance level parameter of each time period;
acquire a type of each access request for the candidate online resource, and determining a coefficient factor of the access request for the candidate online resource based on the type;
determine whether the candidate online resource in each access request is an intermediate resource that leads to a redirected resource, and determining a redirection factor of the access request for the candidate online resource based on a determination on whether the candidate online resource is an intermediate resource;
determine a length factor of each access request for the candidate online resource according to a number of characters included in the access request for the candidate online resource, the length factor being a first value if the number of characters is less than a preset number threshold or a second value if the number of characters is not less than the preset number threshold;
determine a weight value of the candidate online resource based on the time factor, the coefficient factor, the redirection factor, and the length factor;
select, among a plurality of candidate online resources, N target online resources based on weight values of access requests for the candidate online resources; and
display related information of the N target online resources on a target starting page of a browsing application as shortcuts of accessing the N target online resources, wherein N is an integer greater than 2.

8. The electronic device according to claim 7, wherein the processor is configured to: acquire an access quantity of an access request for the candidate online resource in each time period of at least one time period based on a history record of the access request for the candidate online resource; and calculate the corresponding access frequency information in each time period according to the duration of each time period and the corresponding access quantity.

9. The electronic device according to claim 8, wherein the processing unit is configured to:
select, based on the weight value of the access request for the candidate online resource, at least one access request whose weight value is greater than a threshold for the candidate online resource; and
obtain the N target online resources in the at least one access request for the candidate online resource whose weight value is greater than the threshold, and display the related information of the N target online resources on the target starting page of the browsing application.

10. The electronic device according to claim 7, wherein the processor is configured to: sort, based on the weight value of the access request for the candidate online resource;
select the N target online resources ranking top N based on a sorting result; and
display the related information of the N target online resources on the target starting page of the browsing application.

11. The electronic device according to claim 7, wherein the processing unit is configured to: select, based on the weight value of the access request for the candidate online resource, at least one access request whose weight value is greater than a threshold for the candidate online resource; and
obtain the N target online resources in the at least one access request for the candidate online resource whose weight value is greater than the threshold, and display the related information of the N target online resources on the target starting page of the browsing application.

12. A non-transitory computer-readable storage medium storing computer program instructions executable by at least one processor of an electronic device to perform:
determining, for a plurality of access requests of candidate online resources, access frequency information for each candidate online resource in at least two time periods;
determining a time factor of the candidate online resource based on the access frequency information for the candidate online resource in each time period and an importance level parameter of each time period;
acquiring a type of each access request for the candidate online resource, and determining a coefficient factor of the access request for the candidate online resource based on the type;
determining whether the candidate online resource in each access request is an intermediate resource that leads to a redirected resource, and determining a redirection factor of the access request for the candidate online resource based on a determination on whether the candidate online resource is an intermediate resource;
determining a length factor of each access request for the candidate online resource according to a number of characters included in the access request for the candidate online resource, the length factor being a first value if the number of characters is less than a preset number threshold or a second value if the number of characters is not less than the preset number threshold;
determining a weight value of the candidate online resource based on the time factor, the coefficient factor, the redirection factor, and the length factor;
selecting, among a plurality of candidate online resources based on the respective weight values of the candidate online resources, N target online resources; and
displaying related information of the N target online resources on a target starting page of a browsing application as shortcuts of accessing the N target online resources, wherein N is an integer greater than 2.

13. The storage medium according to claim 12, wherein the determining access frequency information for a candidate online resource in at least two time periods comprises:
- acquiring an access quantity of an access request for the candidate online resource in each time period of at least one time period based on a history record of the access request for the candidate online resource; and
- calculating the corresponding access frequency information in each time period according to the duration of each time period and the corresponding access quantity.

14. The storage medium according to claim 12, wherein the selecting, based on the weight value of the candidate online resource, N target online resources; and displaying related information of the N target online resources on a target page of a target application comprises:
- sorting, based on the weight value of the access request for the candidate online resource, selecting the N target online resources ranking top N based on a sorting result, and displaying the related information of the N target online resources on the target starting page of the browsing application.

15. The storage medium according to claim 12, wherein the selecting, based on the weight value of the candidate online resource, N target online resources; and displaying related information of the N target online resources on a target page of a target application comprises:
- selecting, based on the weight value of the access request for the candidate online resource, at least one access request whose weight value is greater than a threshold for the candidate online resource, obtaining the N target online resources in the at least one access request for the candidate online resource whose weight value is greater than the threshold, and displaying the related information of the N target online resources on the target starting page of the browsing application.

\* \* \* \* \*